(12) United States Patent
Ninan et al.

(10) Patent No.: US 12,641,265 B2
(45) Date of Patent: May 26, 2026

(54) SUPPORTING MULTIPLE TARGET DISPLAY TYPES

(71) Applicant: DOLBY LABORATORIES LICENSING CORPORATION

(72) Inventors: Ajit Ninan, San Jose, CA (US); Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/833,245

(22) PCT Filed: Feb. 1, 2023

(86) PCT No.: PCT/US2023/012157
§ 371 (c)(1),
(2) Date: Jul. 25, 2024

(87) PCT Pub. No.: WO2023/150193
PCT Pub. Date: Aug. 10, 2023

(65) Prior Publication Data
US 2025/0133224 A1 Apr. 24, 2025

Related U.S. Application Data

(60) Provisional application No. 63/305,644, filed on Feb. 1, 2022.

(30) Foreign Application Priority Data

Feb. 10, 2022 (EP) ..................................... 22156124

(51) Int. Cl.
*H04N 19/30* (2014.01)
*G06T 3/04* (2024.01)
(Continued)

(52) U.S. Cl.
CPC .............. *H04N 19/30* (2014.11); *G06T 3/04* (2024.01); *G06T 3/4007* (2013.01); *G06T 5/50* (2013.01);
(Continued)

(58) Field of Classification Search
CPC .......... H04N 19/30; H04N 19/46; G06T 3/04; G06T 5/92; G06T 3/4007
See application file for complete search history.

(56) References Cited

U.S. PATENT DOCUMENTS

2019/0311694 A1 10/2019 Van Mourik
2020/0105032 A1* 4/2020 Yang ......................... G06T 5/70

FOREIGN PATENT DOCUMENTS

WO 2005104035 W 11/2005
WO 2007082562 A2 7/2007

OTHER PUBLICATIONS

Franqois E et al: "Signalling, Backward Compatibility, and Display Adaptation for HDR/WCG Video (Draft 2)", 26. JCT-VC Meeting; Dec. 1, 2017-Jan. 20, 2017; Geneva; (Joint Collaborative Team on Video Coding of ISO/IEC JTC1/SC29/WG11 and ITU-T SG. 16 ); URL: http://wftp3.itu/av-arch/jctvc-site/,, No. JCTVC-Z1012, Mar. 27, 2017 (Mar. 27, 2017), XP030118166, pp. 1-33.
(Continued)

*Primary Examiner* — On S Mung

(57) ABSTRACT

A sequence of base layer images for a base reference image display and a set of one or more sequences of beta scale maps corresponding to one or more non-base reference image displays are generated. A subset of one or more sequences of beta scale maps is determined in the set of one or more sequences of beta scale maps based at least in part on display capabilities of a target image display. The sequence of base layer images, along with the subset of one or more sequences of beta scale maps, is encoded into a video signal to cause a recipient device of the video signal to generate a sequence of display images from the sequence of base layer images and the subset of one or more sequences of beta scale maps for rendering on the image display.

17 Claims, 10 Drawing Sheets

(51) Int. Cl.
  *G06T 3/4007*        (2024.01)
  *G06T 5/50*          (2006.01)
  *G06T 5/92*          (2024.01)
  *H04N 19/46*         (2014.01)

(52) U.S. Cl.
  CPC .............. *G06T 5/92* (2024.01); *H04N 19/46*
        (2014.11); *G06T 2200/16* (2013.01); *G06T*
                    *2207/10016* (2013.01)

(56)                References Cited

OTHER PUBLICATIONS

Jeongyun Lim et al: "Reporting: Coding efficiency of the scalable coding for HOR and SOR video using inverse tone mapping on SHVC", 112. MPEG Meeting; Jun. 22, 2015-Jun. 26, 2015; Warsaw; (Motion Picture Expert Group or ISO/IEC JTC1/SC29/WG11), No. m36463 Jun. 20, 2015 (Jun. 20, 2015), XP030267395, Retrieved from the Internet: URL:http://phenix.int-evry.fr/mpeg/doc_end_user/documents/112_Warsaw/wg11 /m36463-v2-m36463.zipm36463_r1 .docx [retrieved on Jun. 20, 2015], pp. 1-5.

Figure 4A:
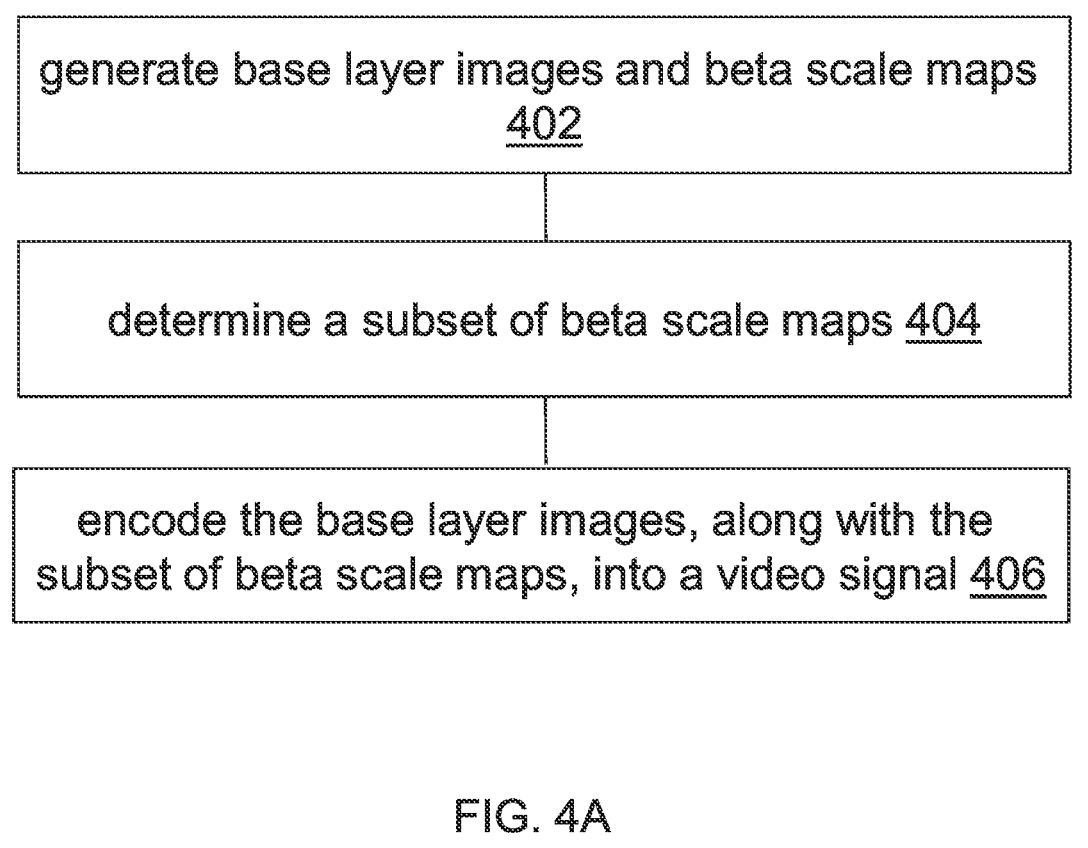

* cited by examiner generate base layer images and beta scale maps
402 determine a subset of beta scale maps 404 encode the base layer images, along with the
subset of beta scale maps, into a video signal 406

FIG. 4A decode, from a video signal, base layer images 452 decode, from the video signal, beta scale maps 454 cause display images derived from the base layer images and the beta scale maps 456

SUPPORTING MULTIPLE TARGET DISPLAY TYPES

CROSS-REFERENCE TO RELATED APPLICATIONS

This application is a U.S. National Stage application under U.S.C. 371 of International Application No. PCT/US23/12157, filed on Feb. 1, 2023 (reference: D21072WO01), which claims priority of the following priority application: U.S. provisional application 63/305, 644, filed 1 Feb. 2022 and EP Application Serial No. 22156124.4, filed 10 Feb. 2022.

TECHNOLOGY

The present invention relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans the some 14-15 or more orders of magnitude of the HVS. In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a viewer or the HVS that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components/channels (e.g., luma Y and chroma Cb and Cr) of a color space, where each color component/channel is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance, represented in a codeword among codewords representing an image, etc.) of an input video signal to output screen color values (e.g., screen luminance, represented in a display drive value among display drive values used to render the image, etc.) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The HVS responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2044:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 302 to 1,000 cd/m² or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). Example (e.g., HDR, Hybrid Log Gamma or HLG, etc.) EOTFs are defined in SMPTE 2044 and Rec. ITU-R BT.2060, "Image parameter values for high dynamic range television for use in production and international programme exchange," (June 2017). See also ITU Rec. ITU-R BT.3040-2, "Parameter values for ultra-high definition television systems for production and international programme exchange," (October 2015), which is incorporated herein by reference in its entirety and relates to Rec. 3040 or BT. 3040 color space. As appreciated by the inventors here, improved techniques for coding high quality video content data to be rendered with a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

FIG. 5 illustrates an example hardware platform on which a computer or a computing device as described herein may be implemented.

DESCRIPTION OF EXAMPLE EMBODIMENTS

Figure 1:
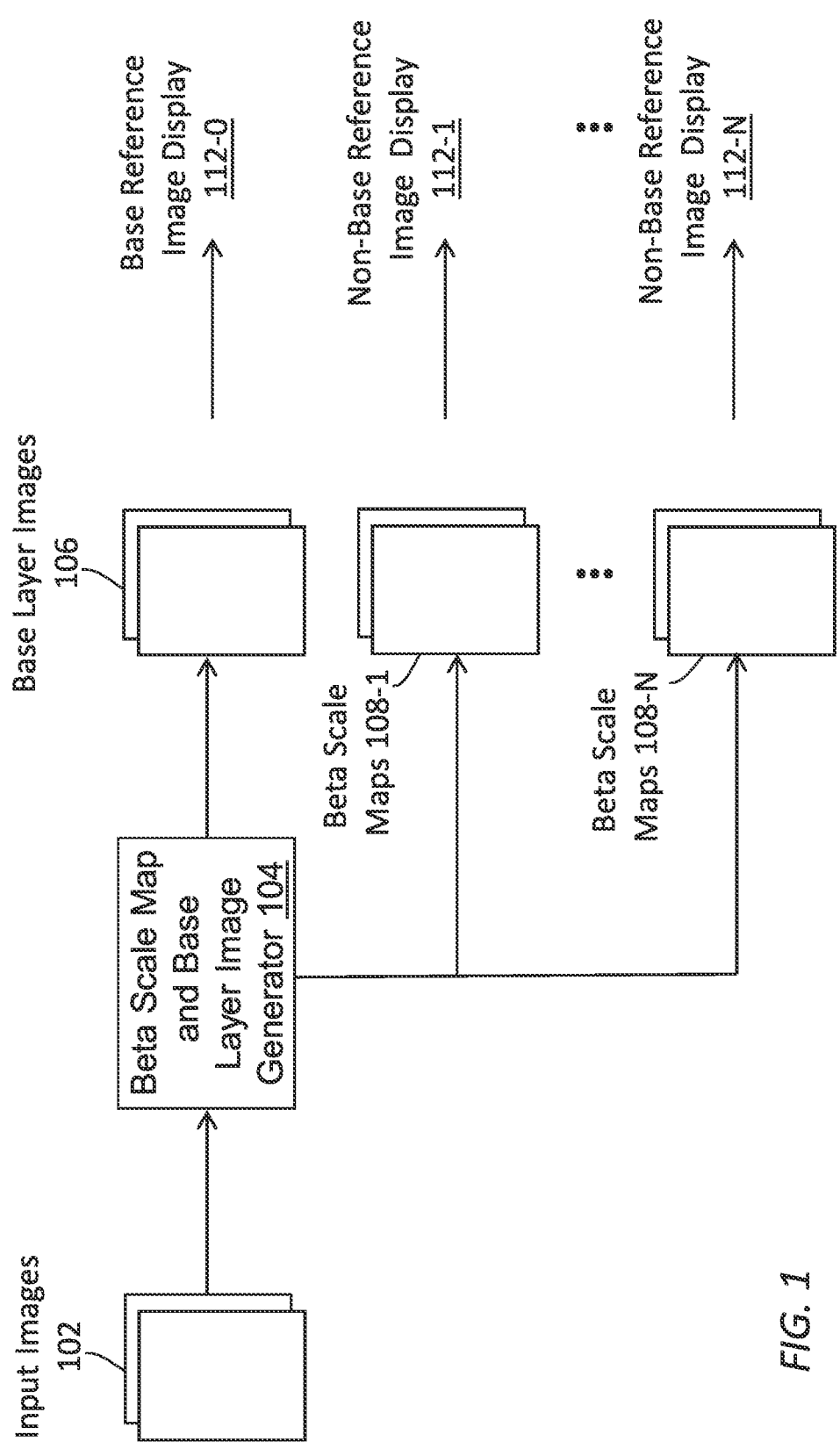
FIG. 1 illustrates an example process flow for generating base layer images and beta scale maps.

Example embodiments, which relate to supporting multiple target display types, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. BETA SCALING AND BASE LAYER IMAGE DATA
3. UPSTREAM AND DOWNSTREAM DEVICES
4. EXAMPLE OPERATIONAL SCENARIOS
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to support optimized rendering of image data for a wide variety of image displays. An upstream device can receive a sequence of (e.g., relatively high quality, consecutive, sequential, etc.) source or input images as input and generate, from the sequence of the source or input images, a corresponding sequence of (e.g., relatively low quality, consecutive, sequential, etc.) base layer images and one or more sequences of (e.g., indicating beta scaling factors, beta scaling methods, etc.) beta scaling maps. The sequence of base layer images may be used to support image rendering optimized for a base reference (e.g., SDR, etc.) image display. The one or more sequences of beta scaling maps may be used in combination with the sequence of base layer images to support image rendering optimized for one or more non-base reference (e.g., HDR, etc.) image displays with different capabilities from those of the base reference image display. Each sequence of beta scaling maps in the one or more sequences of beta scaling maps may be used in combination with the sequence of base layer images to support image rendering optimized for a respective non-base reference image display in the one or more non-base reference (e.g., HDR, etc.) image displays.

As used herein, a beta scale map refers to an image comprising beta scaling data for a corresponding base layer image of a base reference color grade optimized for image rendering operations with the base reference image display. The beta scaling data in the beta scale map includes beta scaling method selectors and/or beta scaling factors to be used to scale the corresponding base layer image of the base reference color grade into a non-base layer image of a non-base reference color grade optimized for image rendering operations with a non-base reference image display in the one or more non-base reference image displays. The beta scale map may be of the same or coarser spatial resolution as compared with the corresponding base layer image.

The beta scaling data in the beta scale map can be used in scaling operations that aggregate other image processing operations including but not limited to reshaping operations and/or display operations that convert the corresponding base layer image of the base reference color grade (e.g., a relatively narrow dynamic range, a relatively small color gamut, etc.) into the non-base layer image of the non-base reference color grade (e.g., a relatively high dynamic range, a relatively wide color gamut, etc.) different from the base reference color grade.

In addition to supporting image rendering optimized for display capabilities of the base and non-base reference image displays, the sequence of base layer images and the one or more sequences of beta scale maps can be used to support target image displays that are different from all the base and non-base reference image displays.

In an example, a sequence of beta scale maps in the one or more sequences of beta scale maps can be sent directly or indirectly from the upstream device to a downstream recipient device—operating with a target image display that is none of the base or non-base reference image displays—along with the sequence of base layer images. The sequence of beta scale maps can be used to generate—e.g., via interpolation or extrapolation, etc.—a target-display-specific sequence of beta scale maps. A target-display-specific sequence of images of a target-display specific color grade optimized for image rendering with display capabilities of the target image display can be generated using the target-display-specific sequence of beta scale maps in combination of the sequence of base layer images. The upstream device may select the sequence of beta scale maps from all the available sequences of beta scale maps based at least in part on information of the display capabilities of the target image display. For example, the sequence of beta scale maps may correspond to the closest color grade to a target-display specific color grade optimized for image rendering with the display capabilities of the target image display.

In another example, two sequences of beta scale maps—e.g., selected from among the sequences of beta scale maps—can be sent directly or indirectly from the upstream device to a downstream recipient device—operating with a target image display that is none of the base or non-base reference image displays—along with the sequence of base layer images. The two sequences of beta scale maps can be used to generate—e.g., via interpolation or extrapolation, etc.—the target-display-specific sequence of beta scale maps. The upstream device may select the two sequences of beta scale maps from all the available sequences of beta scale maps based at least in part on information of the display capabilities of the target image display. For example, the two sequences of beta scale maps may correspond to two closest color grades to the target-display specific color grade optimized for image rendering with the display capabilities of the target image display.

The total number of sequences of beta scale maps to be generated by the upstream device can be adjusted or selected to increase or decrease approximation errors. For example, to reduce approximation errors in interpolation/extrapolation operations, more sequences of beta scale maps can be generated (e.g., beforehand, contemporaneously with image streaming, etc.) by the upstream device. Additionally, optionally or alternatively, the interpolation/extrapolation operations—used to generate a target-display-specific sequence of beta scale maps from received sequence(s) of beta scale maps of reference image display(s)—can be linearly or non-linearly performed. In some operational scenarios, a (e.g., linear, non-linear, etc.) control curve may be used to facilitate the interpolation/extrapolation operations from the received sequence(s) of beta scale maps to the target-display-specific sequence of beta scale maps.

Example embodiments described herein relate to encoding image content. A sequence of base layer images for a base reference image display and a set of one or more sequences of beta scale maps corresponding to one or more non-base reference image displays are generated. A subset of one or more sequences of beta scale maps is determined in the set of one or more sequences of beta scale maps based at least in part on display capabilities of a target image display. The sequence of base layer images, along with the subset of one or more sequences of beta scale maps, is encoded into a video signal to cause a recipient device of the video signal to generate a sequence of display images from the sequence of base layer images and the subset of one or more sequences of beta scale maps for rendering on the image display.

Example embodiments described herein relate to decoding image content. A sequence of base layer images is decoded from a video signal. The sequence of base layer images has been optimized for image rendering on a base reference image display. A subset of one or more sequences of beta scale maps is decoded from the video signal. The subset of one or more sequences of beta scale maps has been determined from a set of one or more sequences of beta scale maps corresponding to one or more non-base reference image displays based on display capabilities of a target image display. A sequence of display images is derived from the sequence of base layer images and the subset of one or more sequences of beta scale maps and is to be rendered on the target image display.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. BETA SCALING AND BASE LAYER IMAGE DATA

FIG. 1 illustrates an example process flow for generating base layer images and beta scale maps. This process flow can be implemented as a part of an upstream image processing device such as a video encoder device, a video streaming server and/or a beta scaling and image data server. Additionally, optionally or alternatively, the process flow can be implemented in a separate or attendant device such as an image pre-processing device operating in conjunction with a video encoder device, a video streaming server and/or a beta scaling and image data server. Some or all of the process flow may be implemented or performed with one or more of: computing processors, audio and video codecs, such as those defined by ATSC, DVB, DVD, Blu-Ray, and other delivery formats, digital signal processors, graphic processing units or GPUs, etc.

A beta scale map and base layer image generator 104 comprises software, hardware, a combination of software and hardware, etc., configured to receive a sequence of (e.g., time consecutive, sequential, multi-view, etc.) input or source images 102. These input images (102) may be received from a video source or retrieved from a video data store. The input images (102) may be digitally captured (e.g., by a digital camera, etc.), generated by converting analog camera pictures captured on film to a digital format, generated by a computer (e.g., using computer animation, image rendering, etc.), and so forth. The input images (102) may be images relating to one or more of: movie releases, archived media programs, media program libraries, video recordings/clips, media programs, TV programs, user-generated video contents, etc.

In some operational scenarios, the beta scale map and base layer image generator (104) can perform image content mapping operations on the sequence of input images (102) to generate a corresponding sequence of base layer images 106 depicting the same visual content as the input images (102) as well as one or more sequences of non-base layer images depicting the same visual content as the sequence of input images (102). Example image content mapping operations may include some or all of: video editing operations, video transformation operations, color grading operations, dynamic range mapping operations, local and/global reshaping operations, display management operations, video special effect operations, and so on.

Some or all of these operations can be performed automatically (e.g., using content mapping tool, color grading toolkit, etc.) with no human input. Additionally, optionally or alternatively, some or all of these operations can be performed manually, automatically with human input, etc.

By way of example but not limitation, the sequences of non-base layer images—of non-base reference color grades (e.g., non-base dynamic range or brightness ranges, non-base color gamuts, etc.) different from a base reference color grade of the sequence of base layer images (106)—may include a specific sequence of non-base layer images of a specific non-base reference color grade. The specific sequence of non-base layer images can be first generated from the input images (102) using some or all of these image processing operations including color grading operations performed fully automatically or partly automatically with human input.

Subsequently, local and/or global reshaping operations may be (e.g., automatically without human input, etc.) performed on the specific sequence of non-base layer images—as generated from the input images (102)—to generate the sequence of base layer images (106), which may be of a relatively narrow dynamic range (or brightness range). Additionally, optionally or alternatively, one or more sequences of non-base layer images can be generated from the specific sequence of non-base layer images and/or the sequence of base layer images (106) using additional local and/or global reshaping operations, additional content mapping operations, additional display management operations, etc.

The sequence of base layer images may be of a base reference color grade optimized for image rendering with a base reference image display 112-0. The one or more sequences of non-base layer images including the specific sequence of non-base layer images and any additionally generated sequence(s) of non-base layer images may be of one or more non-base reference color grades respectively optimized for image rendering with one or more different sets of display capabilities of one or more non-base reference image displays 112-1 through 112-N, where N represents a non-zero positive integer.

The beta scale map and base layer image generator (104) can use the sequence of base layer images and the one or more sequences of non-base layer images to generate one or more sequences of beta scale maps 108-1 through 108-N. The one or more sequences of beta scale maps (108-1 through 108-N) respectively correspond to the one or more sequences of non-base layer images.

Each sequence of beta scale maps in the one or more sequences of beta scale maps (108-1 through 108-N) corresponds to a respective sequence of non-base layer images in the one or more sequences of non-base layer images and is generated from the respective sequence of non-base layer images and the sequence of base layer images.

Each sequence of beta scale maps in the one or more sequences of beta scale maps (108-1 through 108-N) contains beta scaling data used to scale the sequence of base layer images to a respective sequence of non-base layer images in the one or more sequences of non-base layer images. For example, the sequence of base layer images may cover a sequence of (e.g., consecutive, sequential, etc.) time points in a time duration of a media program. Each base layer image in the sequence of base layer images may be rendered for a respective time point in the sequence of time points. Similarly, each of the sequence of beta scale maps and the sequence of non-base layer images—generated from the sequence of base layer images and the sequence of beta scale maps—covers the same sequence of time points. The base layer image for the respective time point may be scaled based on beta scaling data in a respective beta scale map in the sequence of beta scale maps to generate a respective non-base layer image in the sequence of non-base layer images for the respective time point.

Beta scaling can be used to incorporate or implement in lieu of other image processing operations including but not limited to: any, some or all of: reshaping operations, content mapping with no or little human input, content mapping with human input, tone mapping, color space conversion, display mapping, PQ, non-PQ, linear or non-linear coding, image blending, image mixing, linear image mapping, non-linear image mapping, applying EOTF, applying EETF, applying OETF, spatial or temporal downsampling, spatial or temporal upsampling, spatial or temporal resampling, chroma sampling format conversion, etc.

Beta scaling operations as described herein can be implemented as simple scaling operations that apply (e.g., linear, etc.) multiplications and/or additions. Additionally, optionally or alternatively, beta scaling operations as described herein can be implemented in complex or non-linear scaling operations including but not limited to LUT-based scaling. The beta scaling operations may be performed only once at runtime to realize or produce (equivalent) effects of the other image processing operations in lieu of which the beta scaling operations are performed. As a result, relatively complicated image processing operations permeated through an image processing chain/pipeline/framework can be avoided or much simplified under beta scaling techniques as described herein.

Beta scaling as described herein can support global mapping (e.g., global tone mapping, global reshaping, etc.), local mapping (e.g., local tone mapping, local reshaping, etc.) or a combination of global and local mapping.

Example beta scaling operations can be found in U.S. Patent Application No. 63/305,626, with an application title of "BETA SCALE DYNAMIC DISPLAY MAPPING" by Ajit Ninan, Gregory Ward, filed on 1 Feb. 2022, the entire contents of which are hereby incorporated by reference as if fully set forth herein.

3. UPSTREAM AND DOWNSTREAM DEVICES

Figure 2A:
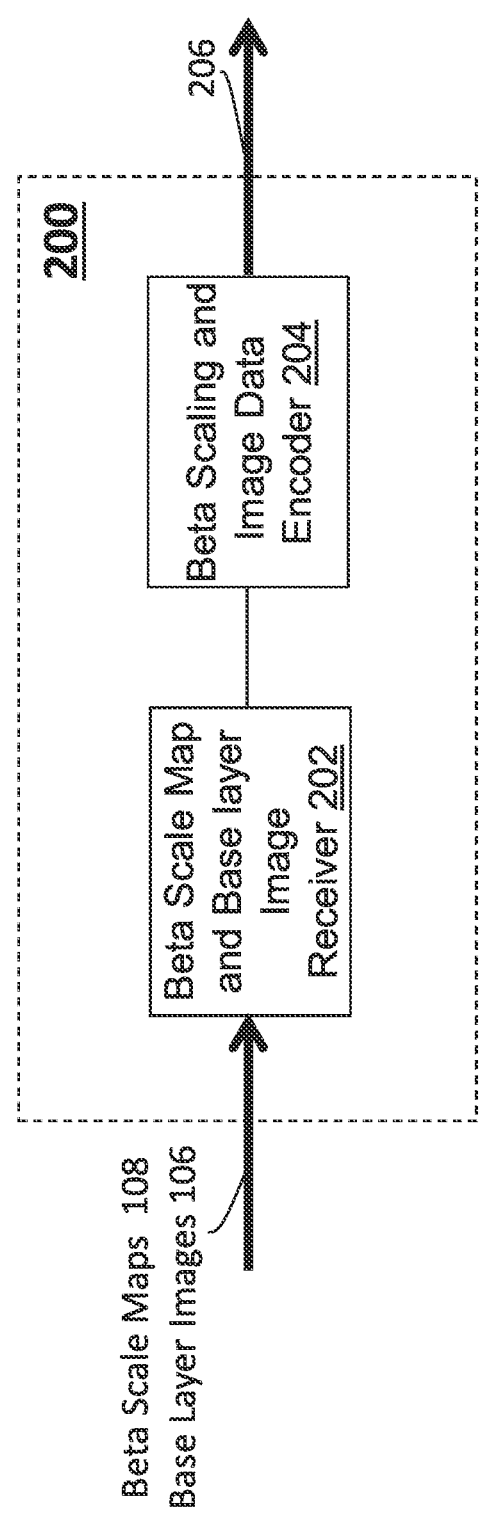
FIG. 2A illustrates an example beta scaling and image data server.

FIG. 2A illustrates an example beta scaling and image data server 200—such as a video encoder device, a video streaming server, or an upstream device—that comprises a beta scale map and base layer image receiver 202, a beta scaling and image data encoder 204, etc. Some or all of the components of the beta scaling and image data server (200) may be implemented by one or more devices, modules, units, etc., in software, hardware, a combination of software and hardware, etc.

In some operational scenarios, the beta scaling and image data server (200) may include or implement the processing blocks of the process flow as illustrated in FIG. 1. Additionally, optionally or alternatively, the beta scaling and image data server (200) may operate in conjunction with a separate upstream device that includes or implements the processing blocks of the process flow as illustrated in FIG. 1.

The beta scale map and base layer image receiver (202) comprises software, hardware, a combination of software and hardware, etc., configured to receive or access SDR and HDR layered image stacks a sequences of base layer images (e.g., 106 of FIG. 1, etc.) and one or more sequences of beta scale maps 108 (e.g., 108-1, 108-2, ... 108-N of FIG. 1, etc.) originated from an internal or external beta scale map and base layer image source.

The sequence of base layer images (106) depicts 2D or 3D visual scenes for a sequence of time points covering a time duration (e.g., of a media program, etc.). The one or more sequences of beta scale maps (108) specifies or defines one or more sequences of scaling operation methods and/or scaling operational parameters to be implemented or performed on the sequence of base layer images to obtain or generate one or more sequences of non-base layer images, each sequence of which depicts the same 2D or 3D visual scenes. More specifically, each sequence of beta scale maps in the one or more sequences of beta scale maps (108) specifies or defines a sequence of scaling operation methods and/or scaling operational parameters—among the one or more sequences of scaling operation methods and/or scaling operational parameters—to be implemented or performed on the sequence of base layer images to obtain or generate a respective sequence of non-base layer images in the one or more sequences of non-base layer images.

Each of the sequence of base layer images and the one or more sequences of non-base layer images respectively represent a base reference color grade and one or more non-base reference color grades. As used herein, a color grade may refer to a (e.g., release, a professionally color graded, color graded by a user or video professional, reconstructed, to-be-predicted, etc.) version of video images. These color grades comprise sets or sequences of corresponding images depicting the same visual scenes or semantic contents, but may differ in one or more of: different dynamic range levels, different color space sizes, different EOTFs, different color space types, etc. These color grades may be respectively optimized for image rendering with different sets of display capabilities of a base reference image display (e.g., 112-0 of FIG. 1, etc.) and one or more non-base reference image displays (e.g., 112-1, ... 112-N of FIG. 1, etc.).

The beta scaling and image data server (200) or a beta scaling and image data encoder 204 therein may generate a video bitstream 206 encoded with a (e.g., requested, pre-configured, pre-generated, etc.) non-base color grade of video content depicted in the sequence of base layer images.

In an example, the non-base color grade or the video bitstream (206) may be generated by the beta scaling and image data encoder (204) in response to the server (200) receiving a request (e.g., in the form of one or more request messages, etc.) from a downstream recipient device or a video streaming client.

In another example, the non-base color grade or the video bitstream (206) may be generated or pre-generated by the beta scaling and image data encoder (204) without the server (200) receiving any request from a downstream recipient device or a video streaming client; the generated or pre-generated color grade or video bitstream (206) can subsequently be accessed, downloaded, streamed or otherwise provided directly or indirectly to a downstream recipient device or a video streaming client.

In some operational scenarios, the beta scaling and image data server (200) can receive, for example in a request for streaming video content to a downstream recipient device or a video streaming client, specific display identification information identifying a specific image display on which the requested video content is to be rendered.

The specific display identification information can be used by the beta scaling and image data server (200) to determine whether the specific image display is the same as, or the closest match with, the base reference image display (112-0) in terms of specific display capabilities of the specific image display and base reference display capabilities of the base reference image display.

If that is the case, the beta scaling and image data server (200) or a separate upstream device operating with the beta scaling and image data server (200) can simply stream the video bitstream (206) encoded with the sequence of base layer images. The video bitstream (206) may not include any sequence of beta scale maps.

On the other hand, in response to determining that the specific image display is different from the base reference image display (112-0) in terms of their respective sets of display capabilities, the beta scaling and image data server (200) or a separate upstream device operating with the beta scaling and image data server (200) can proceed to determine, identify or select one or two closest match reference image displays, from among the one or more non-base reference image displays, and stream the video bitstream (206) encoded with the sequence of base layer images as well as one or more sequences of beta scale maps corresponding to the one or two closest match reference image displays.

As used herein, video content in a video signal (or stream) as described herein may include, but are not necessarily limited to, any of: audiovisual programs, movies, video programs, TV broadcasts, computer games, augmented reality (AR) content, virtual reality (VR) content, automobile entertainment content, etc.

As used herein, a "beta scaling and image data server" may refer to one or more upstream devices, video encoders and/or video streaming servers that prepare and stream video content to one or more video streaming clients such as video decoders in order to render at least a portion of the video content on one or more displays. The displays on which the video content is rendered may be part of the one or more video streaming clients, or may be operating in conjunction with the one or more video streaming clients.

Example beta scaling and image data servers may include, but are not necessarily limited to, any of: cloud-based beta scaling and image data servers located remotely from video streaming client(s), video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

The beta scaling and image data server (200) may be used to support AR applications, VR applications, 360 degree video applications, volumetric video applications, real time video applications, near-real-time video applications, non-real-time omnidirectional video applications, automobile entertainment, helmet mounted display applications, heads up display applications, games, 2D display applications, 3D display applications, multi-view display applications, etc.

Figure 2B:
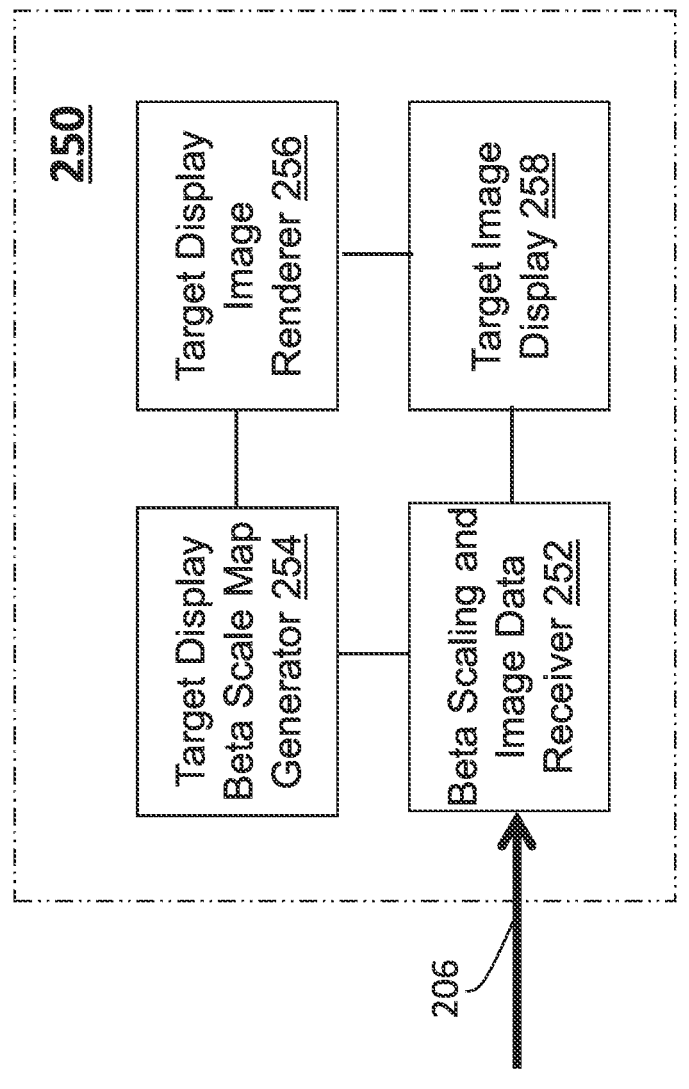
FIG. 2B illustrates an example downstream recipient device.

FIG. 2B illustrates an example downstream recipient device such as a video client device 250 that comprises a beta scaling and image data receiver 252, a target display beta scale map generator 254, a target display image renderer 256, a target image display 258, etc. Some or all of the components of the video client device (150) may be implemented by one or more devices, modules, units, etc., in software, hardware, a combination of software and hardware, etc.

Example video client devices as described herein may include, but are not necessarily limited to only, any of: big screen image displays, home entertainment systems, set-top boxes and/or audiovisual devices operating with image displays, mobile computing devices handheld by users/viewers (e.g., in spatially stable or varying relationships with eyes of the users/viewers, etc.), wearable devices that include or operate with image displays, computing devices including or operating with head mounted displays or heads-up displays, etc.

The video streaming client (250) or the beta scaling and image data receiver (252) can send a request to an upstream device to receive a video bitstream (e.g., 206, etc.) that is encoded with video content and beta scaling data. The video content can be adapted based on the beta scaling data into target display specific video content for image rendering with the target image display (258). In some operational scenarios, the request sent by the video streaming client (250) to the upstream device may include specific display identification information identifying the (specific) target image display (258) on which the requested video content is to be rendered and/or identifying a specific set of display capabilities of the (specific) target image display (258).

In response to receiving the video bitstream (206), the beta scaling and image data receiver (252) can decode the (e.g., real time, near real time, etc.) video bitstream (206) into a sequence of base layer images for a sequence of (e.g., consecutive, sequential, etc.) time points in a time interval or duration of an AR, VR, or immersive video application. The sequence of base layer images represents a base reference color grade optimized for image rendering with a base reference image display (e.g., 112-0 of FIG. 1, etc.).

In addition, the beta scaling and image data receiver (252) retrieves, from the video bitstream (206), one or two sequences of beta scale maps corresponding to the sequence of base layer images. The one or two sequences of beta scale maps can be used to adapt or scale the sequence of base layer images into one or two sequences of non-base layer images representing one or two color grades optimized respectively for one or two non-base reference image displays. In some operational scenarios, the one or two non-base reference image displays may be selected from a larger set of non-base reference image displays based on the specific display identification information provided to the upstream device in the request by the video streaming client (250). More specifically, each sequence of the one or two sequences of beta scale maps can be used to adapt or scale the sequence of base layer images into a respective sequence of non-base layer images in the one or two sequences of non-base layer images of the one or two color grades for image rendering on a respective non-base reference image display of the one or two non-base reference image displays.

The target display beta scale map generator (254) comprises software, hardware, a combination of software and hardware, etc., configured to implement interpolation and/or extrapolation operations to convert the received one or two sequences of beta scale maps into a sequence of target-display specific beta scale maps based at least in part on comparing specific display capabilities of the target image display (258) with some or all of display capabilities of the base reference image display (112-1) and the one or more non-base reference image displays.

The target display image renderer (256) comprises software, hardware, a combination of software and hardware, etc., configured to receive the decoded sequence of base layer images, perform beta scaling operations with the sequence of target-display specific beta scale maps to generate a sequence of (e.g., consecutive, sequential, etc.) display images from the decoded sequence of base layer images, and render the sequence of display images on the target image display (258) for or at the plurality of time points. For example, each target-display specific beta scale maps in the sequence of target-display specific beta scale maps can be used by the target display image renderer (256) to perform beta scaling operations on a respective base layer image in the decoded sequence of base layer images to generate a respective display image in the sequence of display images.

4. EXAMPLE OPERATIONAL SCENARIOS

A base reference color grade and one or more non-base reference color grades generated from one or more sets or sequences of beta scale maps in combination with the base reference color grade may support optimized image rendering for only a (proper) subset of image displays among a wide variety of image displays on which optimized image rendering can be supported under techniques as described herein.

In an example, the base reference color grade may be optimized for image rendering on an SDR image display (e.g., with a peak brightness of 100 nits, 400 nits, etc.) of a relatively low dynamic range, whereas the one or more non-base reference color grades may be optimized for image rendering on HDR image display(s) (e.g., with a peak brightness of 1000 nits, 4000 nits, 10,000+ nits, etc.) of a relatively high dynamic range.

Under techniques as described herein, a target-display specific color grade of an intermediate dynamic range (e.g., with a peak brightness of 800 nits, 2000 nits, etc.) between the standard dynamic range (or the relatively low dynamic range) and the high dynamic range (or the relatively high dynamic range) can be generated for optimized image rendering on a mid-range image display between the SDR image display and the HDR image display(s) using a set or sequence of interpolated or extrapolated beta scale maps, derived from the one or more sets or sequences of beta scale maps, in combination with the base reference color grade. Additionally, optionally or alternatively, a target-display specific color grade of a dynamic range (e.g., a mobile phone supported dynamic range, lower than the relatively low dynamic range, higher than the relatively high dynamic range, etc.) not in between the relatively low dynamic range and the relatively high dynamic range can be generated for optimized image rendering on a corresponding image display using a set or sequence of interpolated or extrapolated beta scale maps, derived from the one or more sets or sequences of beta scale maps, in combination with the base reference color grade. Hence, techniques as described herein can be used to expand optimized image rendering from only a few base and non-base reference image displays of reference display capabilities in terms of reference dynamic ranges such as the SDR and HDR to a wide range of non-reference (target) image displays of non-reference display capabilities such as intermediate, lower or higher dynamic ranges in relation to the SDR and HDR.

In another example, the base reference color grade may be optimized for image rendering on a first image display (e.g., Rec. 709 color space, etc.) of a relatively narrow color gamut, whereas the one or more non-base reference color grades may be optimized for image rendering on second image display(s) of a relatively wide color gamut (e.g., Rec. 2020, etc.).

Under techniques as described herein, a target-display specific color grade of an intermediate color gamut (e.g., DCI-P3, a color gamut smaller than Rec. 2020, etc.) between the relatively narrow color gamut and the relatively wide color gamut can be generated for optimized image rendering on a mid-range image display between the first image display and the second image display(s) using a set or sequence of interpolated or extrapolated beta scale maps, derived from the one or more sets or sequences of beta scale maps, in combination with the base reference color grade. Additionally, optionally or alternatively, a target-display specific color grade of a color gamut (e.g., smaller than Rec. 709, higher than Rec. 2020, etc.) not in between the relatively narrow color gamut and the relatively wide color gamut can be generated for optimized image rendering on a corresponding image display using a set or sequence of interpolated or extrapolated beta scale maps, derived from the one or more sets or sequences of beta scale maps, in combination with the base reference color grade. Hence, techniques as described herein can be used to expand optimized image rendering from only a few base and non-base reference image displays of reference display capabilities in terms of reference color gamuts such as Rec. 709 and Rec. 2020 to a wide range of non-reference (target) image displays of non-reference display capabilities such as intermediate, smaller or wider color gamuts in relation to the Rec. 709 and Rec. 2020.

Figure 3A:
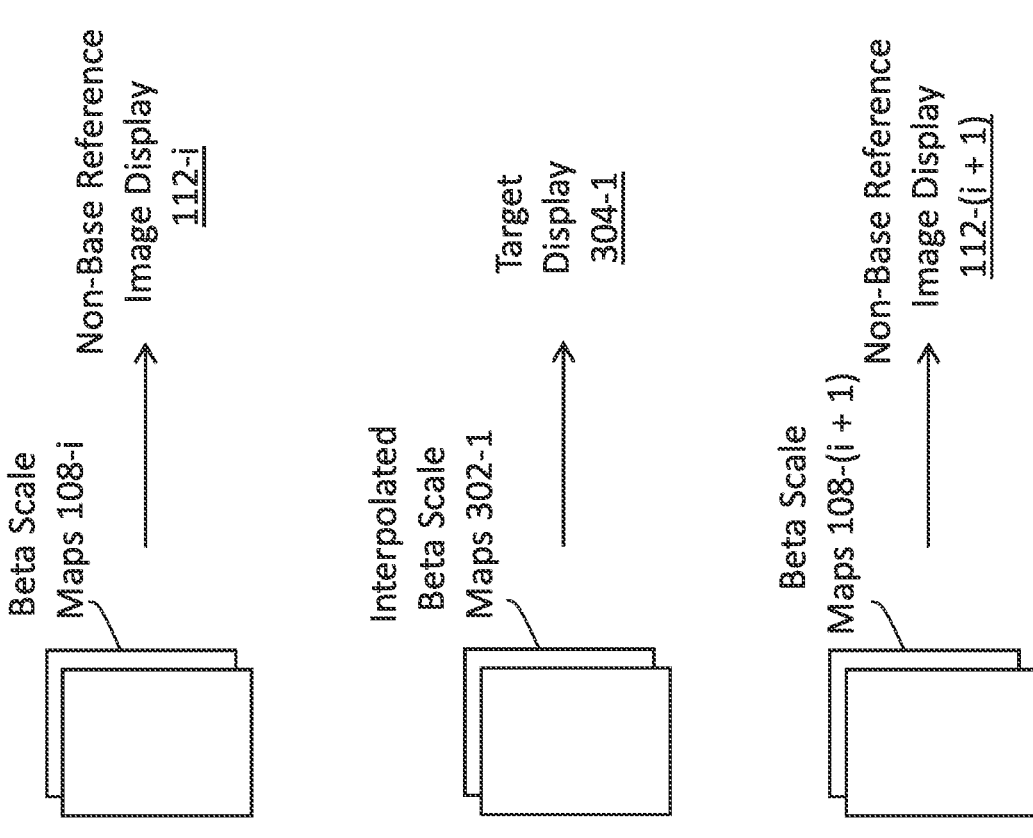
FIG. 3A through FIG. 3C illustrate example operational scenarios in which beta scale maps and base layer images are sent by an upstream device to and received by a downstream recipient device in a video bitstream.

FIG. 3A illustrates example operational scenarios in which two sequences (or sets) of beta scale maps 108-$i$ and 108-($i$+1) may be sent by an upstream device to and received by a downstream recipient device in a video bitstream encoded with a sequence of base layer images representing a base reference color grade.

The first sequence of beta scale map (108-$i$) can be used in combination with the sequence of base layer images to generate a first non-base reference color grade to support image rendering optimized for a first non-base reference image display 112-$i$. The second sequence of beta scale map (108-($i$+1)) can be used in combination with the sequence of base layer images to generate a second non-base reference color grade to support image rendering optimized for a second non-base reference image display 112-($i$+1).

A target image display 304-1 may be of a set of target display capabilities different from, and may fall in between, those of reference display capabilities of the first non-base reference image display (112-$i$) and the second non-base reference image display (112-($i$+1)). As a result, none of the base and the first and second non-base reference color grades may support image rendering optimized for the target image display (304-1).

A sequence of target-display specific interpolated beta scale maps 302-1 may be generated from a combination of the first sequence of beta scale map (108-$i$) and the second sequence of beta scale map (108-($i$+1)) and used in combination with the sequence of base layer images to generate a sequence of target-display specific images for image rendering optimized (e.g., within an approximation error or tolerance, etc.) on the target image display (304-1).

Each target-display specific interpolated beta scale map in the sequence of target-display specific interpolated beta scale maps (302-1) may be generated from a combination of a first respective beta scale map in the first sequence of beta scale map (108-$i$) and a second respective beta scale map in the second sequence of beta scale map (108-($i$+1)). One or more interpolation methods in a wide variety of interpolation methods can be used to interpolate beta scaling data in the first respective beta scale map and the second respective beta scale map into the target-display specific interpolated beta scale map. Example interpolation methods as described herein may include, but are not necessarily limited to only, any of: linear interpolation, piecewise constant interpolation, polynomial interpolation, spline interpolation, function approximation based interpolation, interpolation based at least in part on a control function, etc.

By way of illustration but not limitation, corresponding display capability values such as peak luminance or brightness levels of the target image display (304-1), first non-base reference image display (112-$i$) and second non-base reference image display (112-($i$+1)) may be used to generate input operational parameters for interpolation. Some or all differences of peak luminances or brightness levels between each pair among all possible pairs of the target image display (304-1), first non-base reference image display (112-$i$) and second non-base reference image display (112-($i$+1)) can be generated.

In a first example, in which the same scaling method is specified (e.g., for a pixel or pixel block in the respective base layer image, for background or foreground in the respective base layer image, etc.) in the first and second respective (decoded or received) beta scale maps, some or all of the generated differences from the peak luminances or brightness levels of the target and reference image displays may be used as input operational parameters to compute or derive interpolation related ratios or weights, etc. These interpolation related ratios or weights may be used to linearly or non-linearly interpolate (pre-interpolated) scaling values specified in the first respective beta scale map and the second respective beta scale map into an interpolated scaling value in target-display specific interpolated beta scale map for the scaling method.

In a second example, in which the same scaling method is specified (e.g., for a pixel or pixel block in the respective base layer image, for background or foreground in the respective base layer image, etc.) in the first and second respective (decoded or received) beta scale maps, some or all of the generated differences from the peak luminances or brightness levels of the target and reference image displays may be used as input operational parameters to compute or derive interpolation related ratios or weights, etc. These interpolation related ratios or weights may be used to linearly or non-linearly interpolate (pre-interpolated) function indexes or lookup table indexes specified in the first respective beta scale map and the second respective beta scale map into an interpolated function index or lookup table index in target-display specific interpolated beta scale map. The interpolated function index or lookup table index may be used to look up or generate a target display specific scaling value in a control function or lookup table for the scaling method.

In a third example, in which different scaling methods are specified (e.g., for a pixel or pixel block in the respective base layer image, for background or foreground in the respective base layer image, etc.) in the first and second respective (decoded or received) beta scale maps, scaling data for the different scaling methods may be first converted into scaling values in a common denominator base scaling method (e.g., a scaling method using simple arithmetic operations such as divisions/subtractions, etc.). Some or all of the generated differences from the peak luminances or brightness levels of the target and reference image displays may be used as input operational parameters to compute or derive interpolation related ratios or weights, etc. These interpolation related ratios or weights may be used to linearly or non-linearly interpolate the converted scaling values derived from the scaling data specified in the first respective beta scale map and the second respective beta scale map into an interpolated scaling value in target-display specific interpolated beta scale map for the common denominator base scaling method.

Figure 3B:
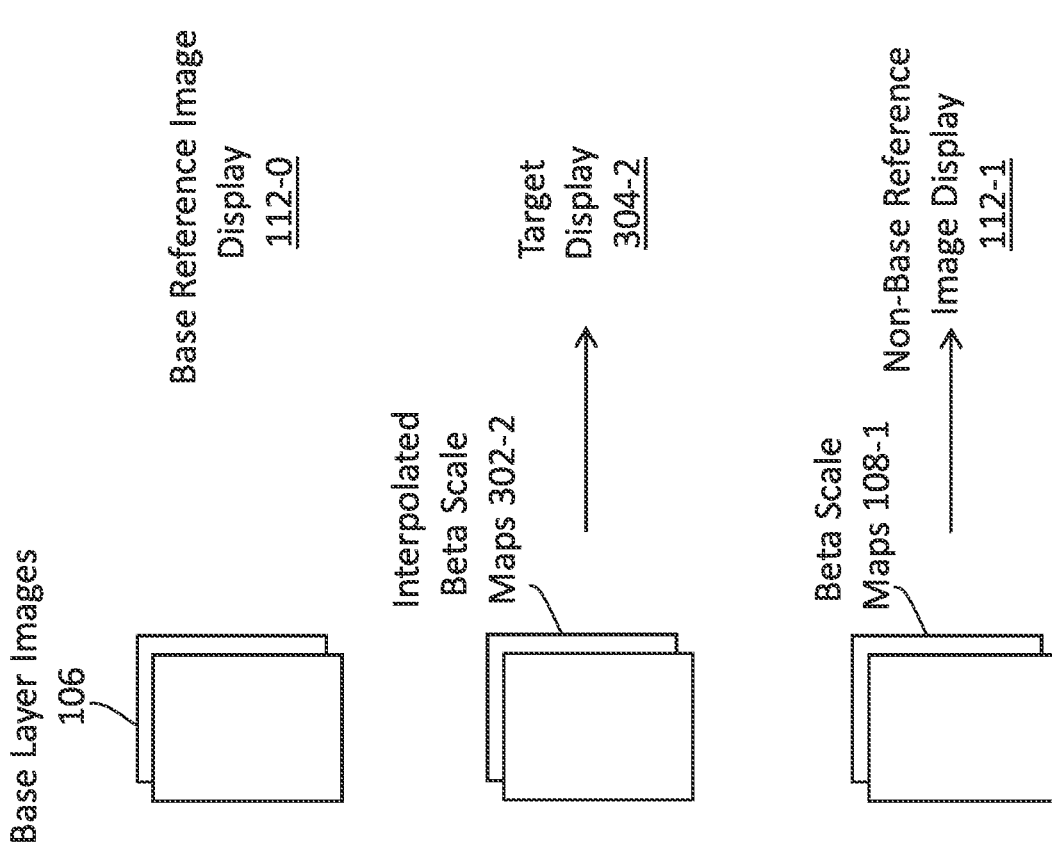

FIG. 3B illustrates example operational scenarios in which a single sequence (or set) of beta scale maps 108-1 may be sent by an upstream device to and received by a downstream recipient device in a video bitstream encoded with a sequence of base layer images representing a base reference color grade.

The sequence of beta scale map (108-1) can be used in combination with the sequence of base layer images to generate a non-base reference color grade to support image rendering optimized for a non-base reference image display 112-1.

A target image display 304-2 may be of a set of target display capabilities different from, and may fall in between, those of reference display capabilities of the base reference image display (112-0) and the non-base reference image display (112-1). As a result, none of the base and the non-base reference color grade may support image rendering optimized for the target image display (304-2).

A sequence of target-display specific interpolated beta scale maps 302-2 may be generated from the sequence of beta scale map (108-1) and used in combination with the sequence of base layer images to generate a sequence of target-display specific images for image rendering optimized (e.g., within an approximation error or tolerance, etc.) on the target image display (304-2).

Each target-display specific interpolated beta scale map in the sequence of target-display specific interpolated beta scale maps (302-2) may be generated from a respective beta scale map in the sequence of beta scale map (108-1). One or more interpolation methods in a wide variety of interpolation methods can be used to interpolate beta scaling data in the respective beta scale map into the target-display specific interpolated beta scale map. Example interpolation methods as described herein may include, but are not necessarily limited to only, any of: linear interpolation, piecewise constant interpolation, polynomial interpolation, spline interpolation, function approximation based interpolation, interpolation based at least in part on a control function, etc.

By way of illustration but not limitation, corresponding display capability values such as peak luminance or brightness levels of the target image display (304-2), base reference image display (112-0) and non-base reference image display (112-1) may be used to generate input operational parameters for interpolation. Some or all differences of peak luminances or brightness levels between each pair among all possible pairs of the target image display (304-2), base reference image display (112-0) and non-base reference image display (112-1) can be generated.

In a first example, in which a scaling method is specified (e.g., for a pixel or pixel block in the respective base layer image, for background or foreground in the respective base layer image, etc.) in the respective (decoded or received) beta scale map, a default scaling value—corresponding to an identity operation or a no-scaling operation—for the scaling method may be generated for the base layer image. Some or all of the generated differences from the peak luminances or brightness levels of the target and reference image displays may be used as input operational parameters to compute or derive interpolation related ratios or weights, etc. These interpolation related ratios or weights may be used to linearly or non-linearly interpolate a (pre-interpolated) scaling value specified in the respective beta scale map and the default scaling value corresponding to an identity operation or a no-scaling operation for the scaling method into an interpolated scaling value in target-display specific interpolated beta scale map for the scaling method.

In a second example, in which a scaling method is specified (e.g., for a pixel or pixel block in the respective base layer image, for background or foreground in the respective base layer image, etc.) in the respective (decoded or received) beta scale map, a default function index or lookup table index—corresponding to an identity operation or a no-scaling operation—for the scaling method may be generated for the base layer image. Some or all of the generated differences from the peak luminances or brightness levels of the target and reference image displays may be used as input operational parameters to compute or derive interpolation related ratios or weights, etc. These interpolation related ratios or weights may be used to linearly or non-linearly interpolate a (pre-interpolated) function index or lookup table index specified in the respective beta scale map and the default function index or lookup table index corresponding to an identity operation or a no-scaling operation for the scaling method into an interpolated function index or lookup table index in target-display specific interpolated beta scale map. The interpolated function index or lookup table index may be used to look up or generate a target display specific scaling value in a control function or lookup table for the scaling method.

Figure 3C:
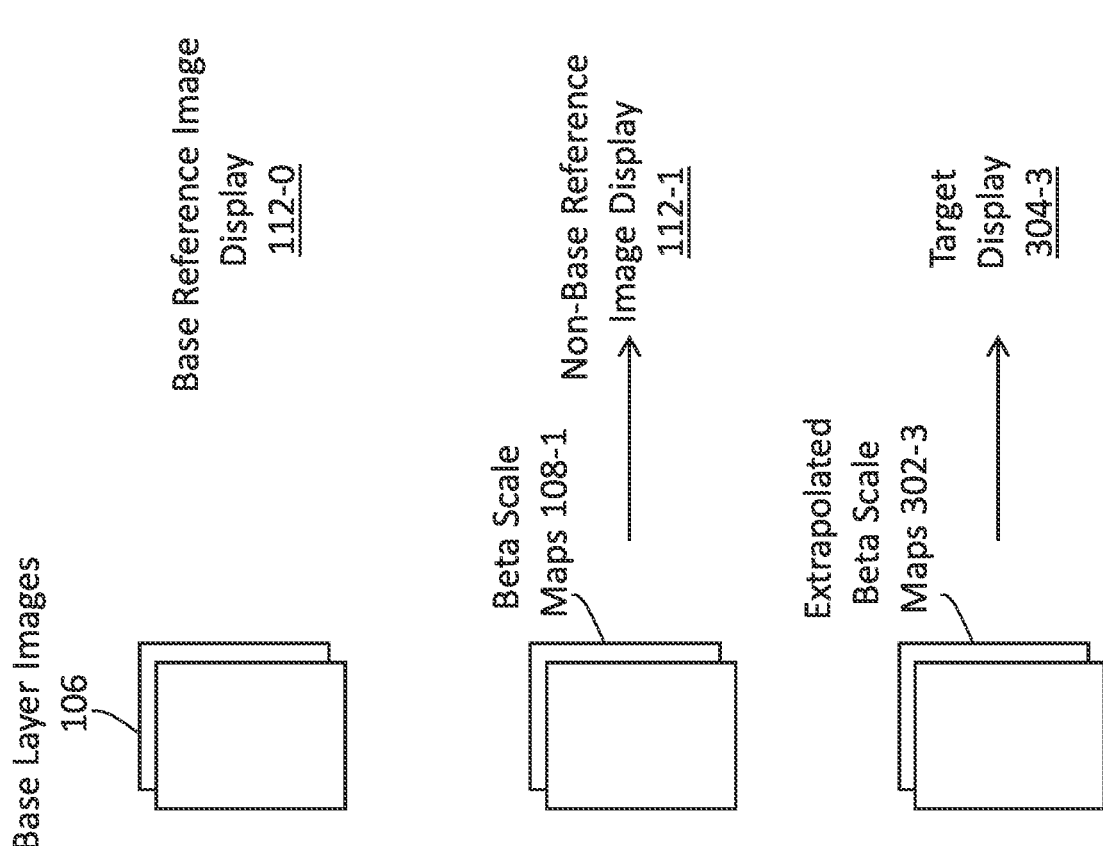

FIG. 3C illustrates example operational scenarios in which a single sequence (or set) of beta scale maps 108-1 may be sent by an upstream device to and received by a downstream recipient device in a video bitstream encoded with a sequence of base layer images representing a base reference color grade.

The sequence of beta scale map (108-1) can be used in combination with the sequence of base layer images to generate a non-base reference color grade to support image rendering optimized for a non-base reference image display 112-1.

A target image display 304-3 may be of a set of target display capabilities different from, and may not fall in between, those of reference display capabilities of the base reference image display (112-0) and the non-base reference image display (112-1). As a result, none of the base and the non-base reference color grade may support image rendering optimized for the target image display (304-3).

A sequence of target-display specific extrapolated beta scale maps 302-3 may be generated from the sequence of beta scale map (108-1) and used in combination with the sequence of base layer images to generate a sequence of target-display specific images for image rendering optimized (e.g., within an approximation error or tolerance, etc.) on the target image display (304-3).

Each target-display specific extrapolated beta scale map in the sequence of target-display specific extrapolated beta scale maps (302-3) may be generated from a respective beta scale map in the sequence of beta scale map (108-1). One or more extrapolation methods in a wide variety of extrapolation methods can be used to extrapolate beta scaling data in the respective beta scale map into the target-display specific extrapolated beta scale map. Example extrapolation methods as described herein may include, but are not necessarily limited to only, any of: linear extrapolation, conic extrapolation, polynomial extrapolation, French curve extrapolation, geometric extrapolation, extrapolation based at least in part on a control function, etc.

By way of illustration but not limitation, corresponding display capability values such as peak luminance or brightness levels of the target image display (304-2), base reference image display (112-0) and non-base reference image display (112-1) may be used to generate input operational parameters for extrapolation. Some or all differences of peak luminances or brightness levels between each pair among all possible pairs of the target image display (304-2), base reference image display (112-0) and non-base reference image display (112-1) can be generated.

In a first example, some or all of the generated differences from the peak luminances or brightness levels of the target and reference image displays may be used as input operational parameters to compute or derive extrapolation related ratios or weights, etc. These extrapolation related ratios or weights may be used to linearly or non-linearly extrapolate a (pre-extrapolated) scaling value specified in the respective beta scale map into an extrapolated scaling value in target-display specific extrapolated beta scale map for the scaling method.

In a second example, some or all of the generated differences from the peak luminances or brightness levels of the target and reference image displays may be used as input operational parameters to compute or derive extrapolation related ratios or weights, etc. These extrapolation related ratios or weights may be used to linearly or non-linearly extrapolate a (pre-extrapolated) function index or lookup table index specified in the respective beta scale map into an extrapolated function index or lookup table index in target-display specific extrapolated beta scale map. The extrapolated function index or lookup table index may be used to look up or generate a target display specific scaling value in a control function or lookup table for the scaling method.

For the purpose of illustration only, it has been described that a display capability value of image displays such as peak luminance or brightness level can be used to derive interpolation or extrapolation operational parameters. It should be noted that, in other embodiments, one or more other display capabilities in addition to or in place of the peak luminance or brightness level can be used to derive interpolation or extrapolation operational parameters. For example, medium or average luminance or brightness levels may be used in part or in whole to derive interpolation or extrapolation operational parameters as described herein.

For the purpose of illustration only, it has been described that display capability values of image displays can be used to derive interpolation or extrapolation operational parameters. It should be noted that, in other embodiments, one or more non-display capability values in addition to or in place of the display capability value(s) can be used to derive interpolation or extrapolation operational parameters. For example, (content-dependent) medium or average luminance or brightness levels in base or non-base layer reference images may be computed for the entire image frame or a portion thereof. The medium or average luminance or brightness levels derived from the base and non-base layer reference images may be used in part or in whole to derive interpolation or extrapolation operational parameters as described herein.

Each target-display specific interpolated or extrapolated beta scale map in the sequence of target-display specific interpolated or extrapolated beta scale maps (e.g., 302-1, 302-2, 302-3, etc.) may be used to perform scaling operations on a respective base layer image in the sequence of base layer images to generate a target-display specific image in the sequence of target-display specific images.

Each target-display specific interpolated or extrapolated beta scale map in the sequence of target-display specific interpolated or extrapolated beta scale maps (302-1) can include or specify scaling method selectors and/or scaling factors to be applied to pixel value(s) at pixels, pixel blocks, foreground areas, background areas, etc., of a respective base layer image in the sequence of base layer images. A scaling method selector as described herein may be used by the recipient device to determine, identify or select, for example from among a plurality of scaling methods, a specific scaling method (e.g., a specific mapping curve, a specific one-dimensional or 1D LUT, a specific 3D LUT, a specific single- or multi-piece polynomial, a specific multi-channel mapping matrix, etc.) to be used for one of: a specific pixel in the respective base layer image, a specific pixel block in the base layer image, for background or foreground in the base layer image, the entire base layer image, an entire scene including the base layer image, a group of pictures/images or GOP including the base layer image, etc. A scaling factor as described herein may be used by the recipient device to apply a scaling operation (e.g., multiplication of the scaling factor in a non-logarithmic representation or domain, addition of the scaling factor in a logarithmic representation or domain, linear mapping with both multiplication of the scaling factor and an addition or offset, etc.) to (e.g., luma, chroma, RGB, YCbCr, etc.) codeword(s) in pixel(s) corresponding to one of: a specific pixel in the respective base layer image, a specific pixel block in the respective base layer image, for background or foreground in the respective base layer image, the entire respective base layer image, an entire scene including the respective base layer image, a group of pictures/images or GOP including the respective base layer image, etc.

Additionally, optionally or alternatively, in some operational scenarios, the beta scale data map can be used to apply non-linear scaling methods to scaling codewords in the respective base layer image. For example, a scaling method selector may be indicated in the beta scale data map and used to select a non-linear scaling method such as a non-linear function (e.g., a sigmoid function, a power function, etc.) for a spatial region in the respective base layer image. In addition, a scaling factor corresponding to the scaling method selector can be indicated in the beta scale data map and used as a controlling parameter (or an input parameter) in the non-linear function to determine or set a specific curve or shape, instead of being used to directly and linearly multiply with pre-scaled codeword(s) to derive scaled codeword(s).

Additionally, optionally or alternatively, in some operational scenarios, the beta scale data map can be used to apply different scaling methods to different value sub-ranges in an entire codeword value range. The entire codeword value range may represent a specific dimension (e.g., color space component, color space channel, etc.) in a multi-dimensional (e.g., three-dimensional, three color channels/components, etc.) codeword space. The codeword space may comprise all available codewords in all channels/components of a color space (e.g., RGB color space, YCbCr color space, etc.). By way of example, the entire codeword value range may be represented by a specific dynamic range such as a specific HDR or a specific SDR. Pixels of luminance or luma codeword values in a first sub-range of the dynamic range such as a bright range in the respective base layer image may be scaled or mapped using a first scaling method—as indicated in the beta scale data set—that applies a single first reshaping mapping curve to these luminance or luma codewords. Pixels of luminance or luma codeword values in a second sub-range of the dynamic range such as a mid-tone range in the respective base layer image may be scaled or mapped using a second scaling method—as indicated in the beta scale data set—that applies different scaling factors in different local image portions to different luminance or luma codewords among the luminance or luma codewords in the mid-tone range.

Techniques as described herein can operate with a video signal or bitstream encoded with a sequence of base layer images and a single sequence of beta scale maps. Additionally, optionally or alternatively, some or all of these techniques operate with a video signal or bitstream encoded with a sequence of base layer images and more than one sequence of beta scale maps.

In some operational scenarios, two or more sequences of beta scale maps respectively for two or more non-base reference image displays are available for selection by an upstream device. A target image display may represent an intermediate image display of display capabilities (e.g., a medium dynamic range, etc.) very different from all base and non-base reference image displays of the lowest and highest display capabilities. To minimize approximation errors in a sequence of interpolated (or extrapolated) beta scale maps to be generated for the target image display, two (closest) sequences of beta scale maps corresponding to two reference image displays with display capabilities closest to those of the target image display may be selected by the upstream device—e.g., from two or more sequences of beta scale maps corresponding to two or more reference image displays—and included with the sequence of base layer images in a video signal or bitstream from the upstream device to a downstream recipient device operating with the target image display. Interpolation or extrapolation operations used to generate the sequence of interpolated (or extrapolated) beta scale maps for the target image display may apply a linear or non-linear scaling function with a per pixel or per pixel block spatial resolution to the two closest sequences of beta scale maps to generate the sequence of interpolated (or extrapolated) beta scale maps for the target image display.

Additionally, optionally or alternatively, a single sequence of beta scale maps can be provided by the upstream device to the downstream recipient device. Interpolation or extrapolation operations used to generate the sequence of interpolated (or extrapolated) beta scale maps for the target image display may apply a linear or non-linear scaling function with a per pixel or per pixel block spatial resolution to the single sequence of beta scale maps to generate the sequence of interpolated (or extrapolated) beta scale maps for the target image display.

A scaling function as described herein can generate target-display specific images optimized for image rendering on the target image display with approximation errors. The sizes or amounts of the approximation errors may be controlled depending on how many sequences of beta scale maps—supporting a corresponding number of non-base reference image displays—are available for selection by the upstream device. To improve accuracy and minimize approximation errors, beta scale maps incorporating different local reshaping operations for different pixels or different pixel blocks or different image areas can be used instead of or in addition to global reshaping operations that apply to all pixels or all pixel blocks or all image areas of an entire base layer image.

Approximation errors can be minimized if there are sequences of beta scale maps (e.g., a specific sequence for a particular iPhone model, a specific sequence for a particular image display model, etc.) available for selection by the upstream device for all target image displays. Approximation errors can be increased if there is only a single sequence of beta scale maps, for example for an HDR target display (along with SDR or low dynamic range images in the base layer).

Figure 3D:
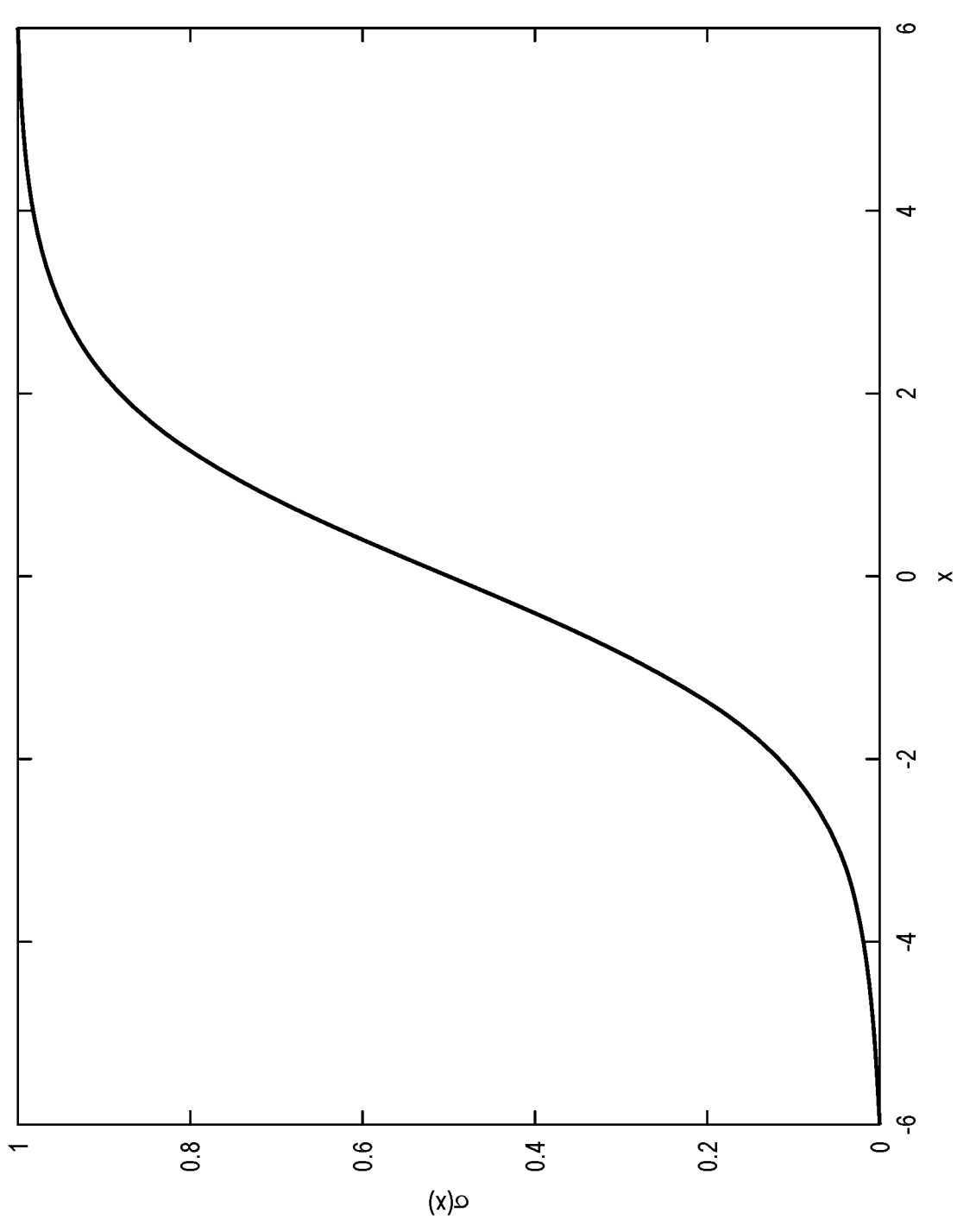
FIG. 3D illustrates an example control curve in connection with interpolation or extrapolation operations of beta scaling data.

As noted, interpolation or extrapolation can be performed linearly or nonlinearly, for example based on a control curve such as illustrated in FIG. 3D. The control curve such as illustrated in FIG. 3D may have different slopes or scaling factors in different value subrange of input operational parameters for interpolation or extrapolation. For example, values of input operational parameters may be computed or derived from display capabilities of the target image display and used to look up a slope or scaling factor in the control curve. The looked up slope or scaling factor can be used to interpolate or extrapolate one or more received or decoded sequences of beta scale maps corresponding to one or more reference image displays with display capabilities closest to those of the target image display for the purpose of generating a sequence of target-display specific interpolated or extrapolated beta scale maps for the target image display

5. EXAMPLE PROCESS FLOWS

FIG. 4A illustrates an example process flow according to an example embodiment of the present invention. In some example embodiments, one or more computing devices or components may perform this process flow. In block 402, an image processing device (e.g., an upstream device, an encoder device, a transcoder, a media streaming server, etc.) generates a sequence of base layer images for a base reference image display and a set of one or more sequences of beta scale maps corresponding to one or more non-base reference image displays.

In block 404, the image processing device determines a subset of one or more sequences of beta scale maps in the set of one or more sequences of beta scale maps based at least in part on display capabilities of a target image display.

In block 406, the image processing device encodes the sequence of base layer images, along with the subset of one or more sequences of beta scale maps, into a video signal to cause a recipient device of the video signal to generate a sequence of display images from the sequence of base layer images and the subset of one or more sequences of beta scale maps for rendering on the image display.

In an embodiment, the sequence of base layer images is of a first dynamic range; wherein the subset of one or more sequences of beta scale maps includes a sequence of beta scale maps used to apply scaling operations on the sequence of base layer images to generate a sequence of non-base layer images of a second dynamic range; the second dynamic range is different from the first dynamic range.

In an embodiment, the subset of one or more sequences of beta scale maps includes a second sequence of beta scale maps used to apply second scaling operations on the sequence of base layer images to generate a second sequence of non-base layer images of a third dynamic range; the third dynamic range is different from the first dynamic range and the second dynamic range.

In an embodiment, each display image in the sequence of display images represents one of: an image of a standard dynamic range, an image of high dynamic range, an image of an intermediate dynamic range between the standard dynamic range and the high dynamic range, an image of a dynamic range lower than the standard dynamic range, an image of a dynamic range higher than the high dynamic range, a display mapped image that is optimized for rendering on a target image display, etc.

In an embodiment, the subset of one or more sequences of beta scale maps is selected from a plurality of sequences of beta scale maps based at least in part on comparing the display capabilities of a target image display with corresponding display capabilities of the one or more non-base reference image displays.

In an embodiment, the scaling operations include one or more of: simple scaling with scaling factors, applying one or more codeword mapping relationships to map codewords of the sequence of base layer images to generate corresponding codeword of a corresponding sequence of beta scaled images, etc.

In an embodiment, the scaling operations are performed in place of one or more of: global tone mapping, local tone mapping, display mapping operations, color space conversion, linear mapping, non-linear mapping, etc.

In an embodiment, the sequence of base layer images is encoded in a base layer of the video signal.

In an embodiment, a common sequence of source images is used to generate both the sequence of base layer images for the base reference image display and the set of one or more sequences of beta scale maps corresponding to the one or more non-base reference image displays.

Figure 4B:
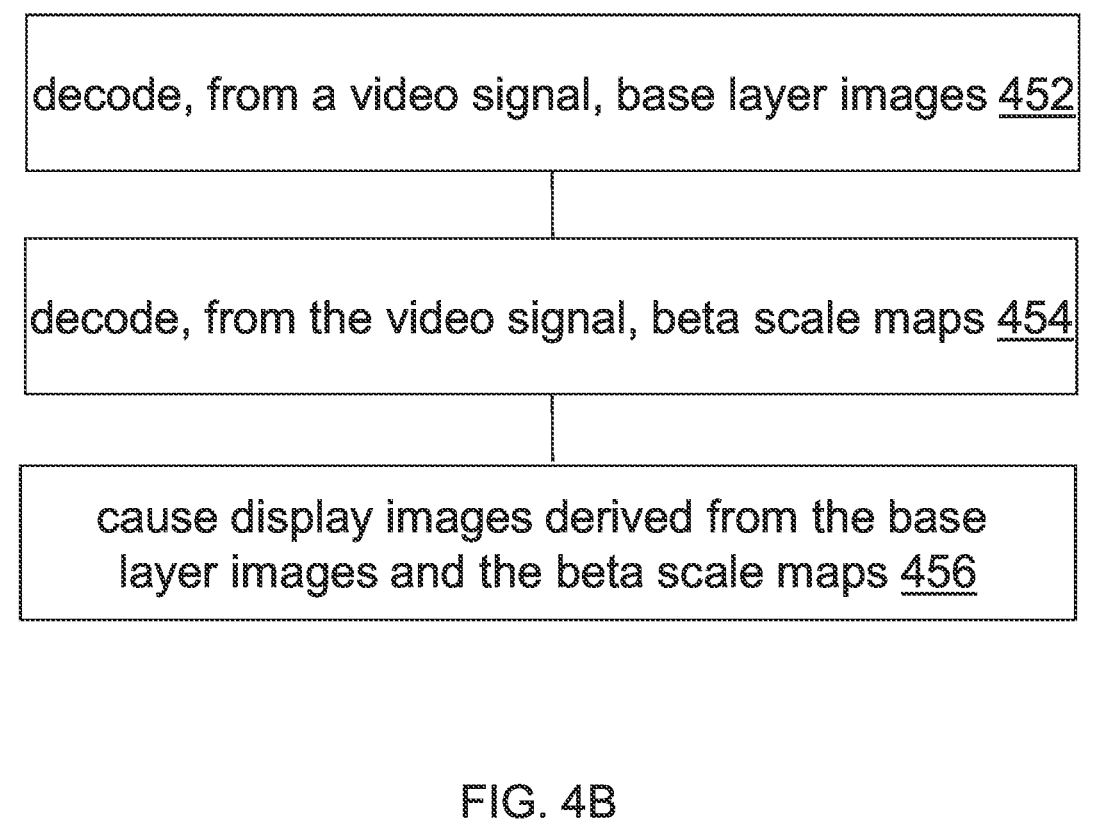

FIG. 4B illustrates an example process flow according to an example embodiment of the present invention. In some example embodiments, one or more computing devices or components may perform this process flow. In block 452, a recipient device decodes, from a video signal, a sequence of base layer images, the sequence of base layer images having been optimized for image rendering on a base reference image display.

In block 454, the recipient device decodes, from the video signal, a subset of one or more sequences of beta scale maps, the subset of one or more sequences of beta scale maps having been determined from a set of one or more sequences of beta scale maps corresponding to one or more non-base reference image displays based on display capabilities of a target image display.

In block 454, the recipient device causes a sequence of display images derived from the sequence of base layer images and the subset of one or more sequences of beta scale maps to be rendered on the target image display.

In an embodiment, a subset of one or more sequences of beta scale maps include one of: a single sequence of beta scale maps, or two sequences of beta scale maps.

In an embodiment, the sequence of display images is generated from a sequence of extrapolated beta scale maps in combination with the sequence of base layer images; the sequence of extrapolated beta scale maps is generated from the subset of one or more sequences of beta scale maps through extrapolation operations using operational parameters determined based at least in part on display capabilities of the one or more non-base reference image displays and the display capabilities of the target image display.

In an embodiment, the sequence of display images is generated from a sequence of interpolated beta scale maps in combination with the sequence of base layer images; the sequence of interpolated beta scale maps is generated from the subset of one or more sequences of beta scale maps through interpolation operations using operational parameters determined based at least in part on display capabilities of the one or more non-base reference image displays and the display capabilities of the target image display.

In an embodiment, the set of user pose selected sampled views includes two or more sampled views; the display image is generated by performing image blending operations on two or more intermediate images generated for the current view from the set of layered images and the set of adjusted alpha maps.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
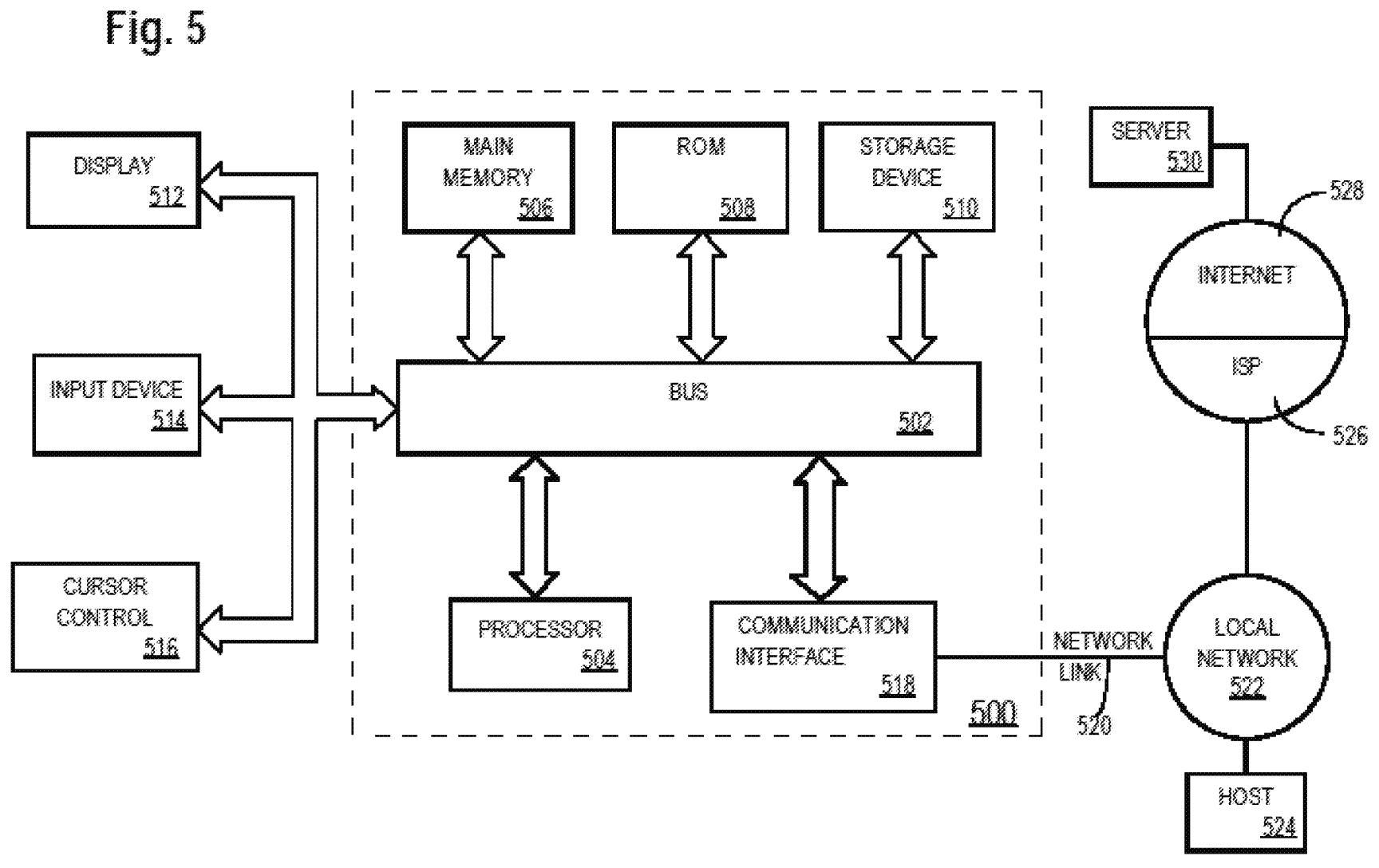

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following Enumerated Example Embodiments (EEEs):

EEE1. A method comprising: generating a sequence of base layer images for a base reference image display and a set of one or more sequences of beta scale maps corresponding to one or more non-base reference image displays; determining a subset of one or more sequences of beta scale maps in the set of one or more sequences of beta scale maps based at least in part on display capabilities of a target image display; encoding the sequence of base layer images, along with the subset of one or more sequences of beta scale maps, into a video signal to cause a recipient device of the video signal to generate a sequence of display images from the sequence of base layer images and the subset of one or more sequences of beta scale maps for rendering on the image display.

EEE2. The method of EEE1, wherein the sequence of base layer images is of a first dynamic range; wherein the subset of one or more sequences of beta scale maps includes a sequence of beta scale maps used to apply scaling operations on the sequence of base layer images to generate a sequence of non-base layer images of a second dynamic range; wherein the second dynamic range is different from the first dynamic range.

EEE3. The method of EEE2, wherein the subset of one or more sequences of beta scale maps includes a second sequence of beta scale maps used to apply second scaling operations on the sequence of base layer images to generate a second sequence of non-base layer images of a third dynamic range; wherein the third dynamic range is different from the first dynamic range and the second dynamic range.

EEE4. The method of any of EEEs 1-3, wherein each display image in the sequence of display images represents one of: an image of a standard dynamic range, an image of high dynamic range, an image of an intermediate dynamic range between the standard dynamic range and the high dynamic range, an image of a dynamic range lower than the standard dynamic range, an image of a dynamic range higher than the high dynamic range, or a display mapped image that is optimized for rendering on a target image display.

EEE5. The method of any of EEEs 1-4, wherein the subset of one or more sequences of beta scale maps is selected from a plurality of sequences of beta scale maps based at least in part on comparing the display capabilities of a target image display with corresponding display capabilities of the one or more non-base reference image displays.

EEE6. The method of any of EEEs 1-5, wherein the scaling operations include one or more of: simple scaling with scaling factors, or applying one or more codeword mapping relationships to map codewords of the sequence of base layer images to generate corresponding codeword of a corresponding sequence of beta scaled images.

EEE7. The method of any of EEEs 1-6, wherein the scaling operations are performed in place of one or more of: global tone mapping, local tone mapping, display mapping operations, color space conversion, linear mapping, or non-linear mapping.

EEE8. The method of any of EEEs 1-7, wherein the sequence of base layer images is encoded in a base layer of the video signal.

EEE9. The method of any of EEEs 1-8, wherein a common sequence of source images is used to generate both the sequence of base layer images for the base reference image display and the set of one or more sequences of beta scale maps corresponding to the one or more non-base reference image displays.

EEE10. A method comprising: decoding, from a video signal, a sequence of base layer images, the sequence of base layer images having been optimized for image rendering on a base reference image display; decoding, from the video signal, a subset of one or more sequences of beta scale maps, the subset of one or more sequences of beta scale maps having been determined from a set of one or more sequences of beta scale maps corresponding to one or more non-base reference image displays based on display capabilities of a target image display; causing a sequence of display images derived from the sequence of base layer images and the subset of one or more sequences of beta scale maps to be rendered on the target image display.

EEE11. The method of EEE10, where a subset of one or more sequences of beta scale maps include one of: a single sequence of beta scale maps, or two sequences of beta scale maps.

EEE12. The method of EEE10 or 11, wherein the sequence of display images is generated from a sequence of extrapolated beta scale maps in combination with the sequence of base layer images; wherein the sequence of extrapolated beta scale maps is generated from the subset of one or more sequences of beta scale maps through extrapolation operations using operational parameters determined based at least in part on display capabilities of the one or more non-base reference image displays and the display capabilities of the target image display.

EEE13. The method of EEE10 or 11, wherein the sequence of display images is generated from a sequence of interpolated beta scale maps in combination with the sequence of base layer images; wherein the sequence of interpolated beta scale maps is generated from the subset of one or more sequences of beta scale maps through interpolation operations using operational parameters determined based at least in part on display capabilities of the one or more non-base reference image displays and the display capabilities of the target image display.

EEE14. An apparatus performing any of the methods as recited in EEEs 1-13.

EEE15. A non-transitory computer readable storage medium, storing software instructions, which when executed by one or more processors cause performance of the method recited in any of EEEs 1-13.

It is claimed:

1. A method comprising:

generating a sequence of base layer images for a base reference image display and a set of one or more sequences of beta scale maps corresponding to one or more non-base reference image displays;

determining a subset of one or more sequences of beta scale maps in the set of one or more sequences of beta scale maps based at least in part on display capabilities of a target image display;

encoding the sequence of base layer images, along with the subset of one or more sequences of beta scale maps, into a video signal to cause a recipient device of the video signal to generate a sequence of display images, from the sequence of base layer images and the subset of one or more sequences of beta scale maps, for rendering on the target image display, wherein the beta scale map corresponds to an image comprising beta scaling data for a corresponding base layer image of a base reference color grade optimized for image rendering operations with the base reference image display, wherein the subset of the one or more sequences of the beta scale maps are target-display specific sequences of the beta scale maps for the target image display.

2. The method of claim 1, wherein the sequence of base layer images is of a first dynamic range; wherein the subset of one or more sequences of beta scale maps includes a sequence of beta scale maps used to apply scaling operations on the sequence of base layer images to generate a sequence of non-base layer images of a second dynamic range; wherein the second dynamic range is different from the first dynamic range.

3. The method of claim 2, wherein the subset of one or more sequences of beta scale maps includes a second sequence of beta scale maps used to apply second scaling operations on the sequence of base layer images to generate a second sequence of non-base layer images of a third dynamic range; wherein the third dynamic range is different from the first dynamic range and the second dynamic range.

4. The method of claim 1, wherein each display image in the sequence of display images represents one of: an image of a standard dynamic range, an image of high dynamic range, an image of an intermediate dynamic range between the standard dynamic range and the high dynamic range, an image of a dynamic range lower than the standard dynamic range, an image of a dynamic range higher than the high dynamic range, or a display mapped image that is optimized for rendering on the target image display.

5. The method of claim 1, wherein the subset of one or more sequences of beta scale maps is selected from a plurality of sequences of beta scale maps based at least in part on comparing the display capabilities of the target image display with corresponding display capabilities of the one or more non-base reference image displays.

6. The method of claim 1, wherein the scaling operations include one or more of: simple scaling with scaling factors, or applying one or more codeword mapping relationships to map codewords of the sequence of base layer images to generate corresponding codeword of a corresponding sequence of beta scaled images.

7. The method of claim 1, wherein the scaling operations are performed in place of one or more of: global tone mapping, local tone mapping, display mapping operations, color space conversion, linear mapping, or non-linear mapping.

8. The method of claim 1, wherein the sequence of base layer images is encoded in a base layer of the video signal.

9. The method of claim 1, wherein a common sequence of source images is used to generate both the sequence of base layer images for the base reference image display and the set of one or more sequences of beta scale maps corresponding to the one or more non-base reference image displays.

10. A method comprising:
decoding, from a video signal, a sequence of base layer images, the sequence of base layer images having been optimized for image rendering on a base reference image display;
decoding, from the video signal, a subset of one or more sequences of beta scale maps, the subset of one or more sequences of beta scale maps having been determined from a set of one or more sequences of beta scale maps corresponding to one or more non-base reference image displays based on display capabilities of a target image display;
causing a sequence of display images from the sequence of base layer images and the subset of one or more sequences of beta scale maps, to be rendered on the target image display, wherein the beta scale map corresponds to an image comprising beta scaling data for a corresponding base layer image of a base reference color grade optimized for image rendering operations with the base reference image display,
wherein the subset of the one or more sequences of the beta scale maps are target-display specific sequences of the beta scale maps for the target image display.

11. The method of claim 10, where a subset of one or more sequences of beta scale maps include one of: a single sequence of beta scale maps, or two sequences of beta scale maps.

12. The method of claim 10, wherein the sequence of display images is generated from a sequence of extrapolated beta scale maps in combination with the sequence of base layer images; wherein the sequence of extrapolated beta scale maps is generated from the subset of one or more sequences of beta scale maps through extrapolation operations using operational parameters determined based at least in part on display capabilities of the one or more non-base reference image displays and the display capabilities of the target image display.

13. The method of claim 10, wherein the sequence of display images is generated from a sequence of interpolated beta scale maps in combination with the sequence of base layer images; wherein the sequence of interpolated beta scale maps is generated from the subset of one or more sequences of beta scale maps through interpolation operations using operational parameters determined based at least in part on display capabilities of the one or more non-base reference image displays and the display capabilities of the target image display.

14. An apparatus performing the method recited in claim 1.

15. A non-transitory computer readable storage medium, storing software instructions, which when executed by one or more processors cause performance of the method recited in claim 1.

16. The method of claim 1, wherein each sequence of beta scale maps in the one or more sequences of beta scale maps includes respective operational parameters for scaling operations to be performed on the sequence of base layer images to generate a respective sequence of non-base layer images for a respective non-base reference image display in the one or more non-base reference image displays.

17. The method of claim 10, wherein each sequence of beta scale maps in the one or more sequences of beta scale maps includes respective operational parameters for scaling operations to be performed on the sequence of base layer images to generate a respective sequence of non-base layer images for a respective non-base reference image display in the one or more non-base reference image displays.

* * * * *